Sept. 1, 1942.                R. S. BASSETT                2,294,825
                              LIQUID METER
                         Filed Sept. 20, 1940           2 Sheets-Sheet 1

INVENTOR.
Robert S. Bassett
By Parker, Rockman & Farmer
ATTORNEYS.

Sept. 1, 1942.   R. S. BASSETT   2,294,825
LIQUID METER
Filed Sept. 20, 1940   2 Sheets-Sheet 2

CENTER PLANE OF DISK WEB
$r^1 = r^2$ $r^1$ is less than $r^2$ $r^1 = r^2$

INVENTOR.
Robert S. Bassett
By Parker, Rockwood & Farmer.
ATTORNEYS.

Patented Sept. 1, 1942

2,294,825

UNITED STATES PATENT OFFICE 2,294,825

LIQUID METER

Robert S. Bassett, Buffalo, N. Y.

Application September 20, 1940, Serial No. 357,570

10 Claims. (Cl. 73—258)

This invention relates to improvements in liquid meters of the nutating disk piston type.

In meters of this type the piston includes a disk which is secured to a central ball, and which operates in a spherical bearing socket to guide the movement of the disk. In some types of liquid meters, it sometimes happens that the liquid causes the ball to expand and, consequently, to bind in its spherical seat so as to stop the motion of the disk, or the ball may become damaged or deformed by being pressed while swollen against the upper portion of the spherical seat, thus causing indentations and consequent leaks which interfere with the accuracy of the meter. For example, meters which are designed for use on cold water sometimes are exposed to water at fairly high temperatures so that the ball may expand with the heat, and thus either grip itself in its seat or become deformed by pressure against the seat, so that when the meter again operates on cold water and the ball contracts, leaks may occur past indentations made in the disk ball by pressure against it when heated.

One of the objects of this invention is to provide a meter piston of this type with a ball which is so formed as to greatly reduce the chances of damage to the same in the event that the ball expands by leaving space for this temporary expansion. Another object of this invention is to provide a meter of this type with a ball of special construction in which the lower portion of the ball is substantially of the normal size heretofore commonly employed and in which the upper portion of the ball is of reduced size. A further object is to provide a piston with a ball of improved shape and proportions, which will have a slight clearance with the upper portion of the socket, to produce a freely operating piston, and in which leakage of liquid between the ball and the upper portion of the socket is minimized by a thin film of the liquid which is being metered, which forms a liquid packing at that point.

Another object of this invention is to provide a meter disk having a groove in the peripheral edge thereof which operates to produce an improved seal between the disk and its housing.

Other objects of this invention will appear from the following description and claims.

Figure 1:
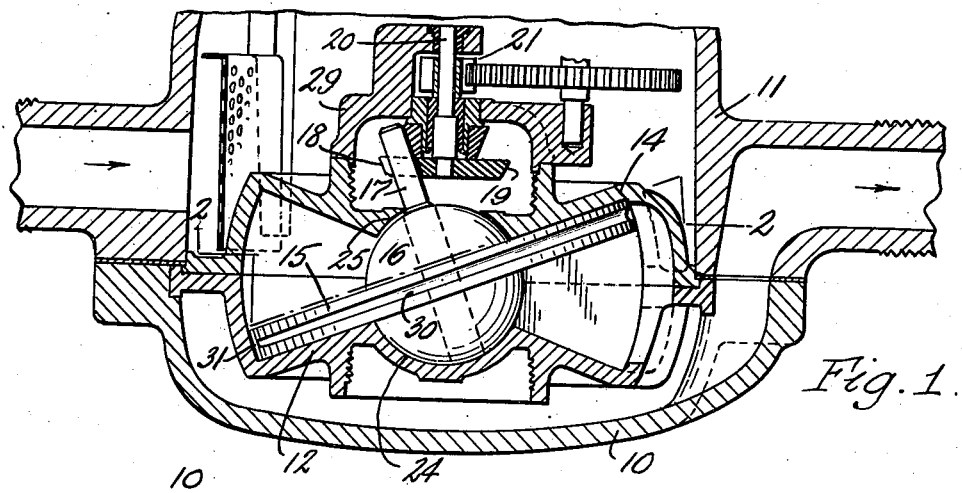
Fig. 1 is a central sectional elevation of the lower portion of a liquid meter embodying this invention.

I have shown my improved piston as employed in connection with a liquid meter of well known construction, including a lower or bottom casing 10 and an upper casing or housing 11. The piston chamber is formed in two parts, the lower part 12 being arranged within the lower casing 10, and the upper part 14 being arranged mainly in the upper housing 11. The piston arranged within the piston chamber includes a piston disk 15, a ball 16, and a disk pin 17, which engages in a slot or recess 18 formed in a rotary disk 19, secured to an upright shaft 20, on which a pinion 21 is mounted, which forms a part of the usual gear train which operates the meter register (not shown). The lower part 12 of the piston chamber is provided with a spherical bearing or socket 24 for the lower half of the ball 16, and 25 represents the upper spherical bearing or socket for the ball. My improved piston may be employed in a meter of other construction.

Heretofore it was thought to be essential that the ball 16 should fit snugly and bear on the inner surface of the upper bearing socket 25 as well as on the lower socket 24 in order to form a watertight joint. Meters of this type operated successfully, if used under conditions which would not produce expansion or swelling of the balls 16. In water meters, these balls are usually made of hard rubber or of a rubber composition loaded with a mineral filler to reduce expansion. In gasoline meters, a Bakelite ball is often used. It sometimes happens that a meter designed to meter a cold pure liquid is subjected temporarily to elevated temperatures, or to liquids such as impure gasoline, which produce an expansion or swelling of the ball, with the result that the ball would bind in its bearing sockets and thus stop the operation of the meter, and sometimes the surface of the ball would be permanently deformed by such expansion, thus destroying the accuracy of the meter.

I have found that this difficulty can to a large extent be overcome by reducing the size of the upper half of the disk ball to a slight extent, so that when assembled in the meter, the upper portion of the disk ball will be entirely out of contact with the upper bearing socket 25, and if the clearance thus produced between the upper portion of the disk ball and its socket is properly designed, the thin film of liquid in the space between the ball and its bearing socket forms a packing which serves to prevent any substantial leakage of liquid through this clearance, and at the same time reduces the friction at this portion of the ball. Furthermore, this clearance provides considerable leeway for the expansion of the ball due to heat or liquids tending to cause the ball to swell temporarily, thus materially reducing the chance for stopping the operation of the meter, and for damage to the disk ball, because of a slight swelling, which, however, would stop a conventional meter of former design.

If the disk ball becomes expanded due to heat or other causes, the disk is moved upwards into engagement with the upper wall of the metering chamber, due to the expansion of the lower half of the ball 16, and the engagement of the upper surface of the metering disk thus acts somewhat as a stop to limit the pressing of the upper half of the disk ball against its spherical socket 25. Consequently, if a ball of my improved construction is provided in which the upper half of the ball is of less height than heretofore used, damage to the ball is prevented by the contact of the piston disk 15 with the upper wall of the measuring chamber. It will be noted that the lower socket 24 has a much more extensive bearing surface on the lower half of the ball than the upper bearing socket, since the middle portion of the upper socket must, of course, be removed to permit the passage of the piston pin 17. Consequently, if the lower half of the ball is pressed against the lower socket, there is materially less chance of deformation of the lower part of the ball.

Figure 2:
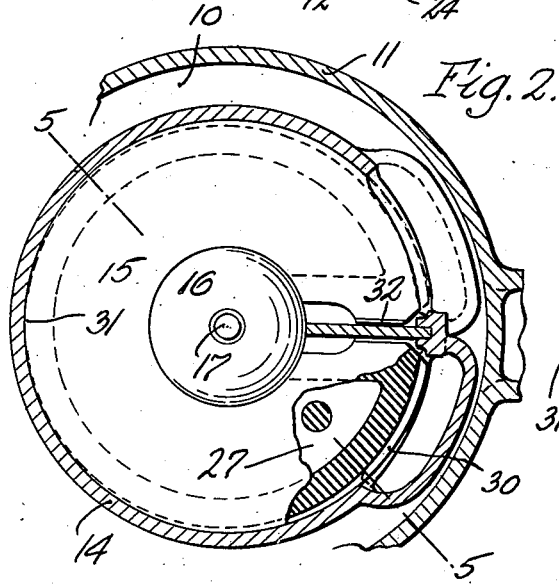
Fig. 2 is a fragmentary sectional plan thereof, taken approximately on line 2—2, Fig. 1.
Figure 3:
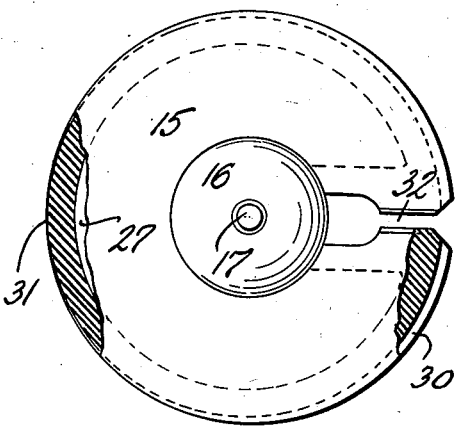
Fig. 3 is a plan view, partly in section, of a meter disk embodying this invention and showing a groove in the periphery thereof.

When it is expected that a meter will be used on hot water or other liquid having a tendency to swell the composition of the ball and disk, the disk is preferably made with a metallic reinforcing plate 27, as shown in Fig. 2, which is embedded in the disk web. This metallic plate will prevent excessive expansion of the disk in the direction of the diameter of the disk web, since the reinforcing plate practically restricts the expansion of the disk to that of the metallic plate, which has a much lower coefficient of expansion than hard rubber. Consequently, when a piston disk of this reinforced type expands because of heat or for other reasons, the hard rubber must increase in volume in accordance with increases in temperature, and since the reinforcing plate restricts peripheral expansion, it also causes a relatively greater expansion in thickness, especially of the disk ball. Consequently, my improvements are very desirable for use in connection with reinforced piston disks, although this invention is equally applicable to piston disks without metallic reinforcement.

Figure 10:
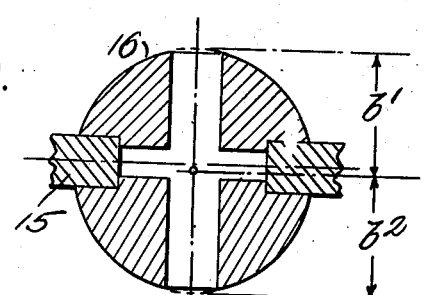
Fig. 10 is a vertical sectional view of a pair of half balls assembled with a disk.

In my invention as claimed, "the central point of said ball" means the point on the vertical axis or disk pin that is midway between the two points formed by the intersection of the axis of the assembled ball with the surface of the ball when extended across the disk pin hole as in Fig. 10.

As the ball is not a true sphere with some of my constructions, it is necessary to make a distinction between the central point of the ball as compared with the more usual ball or radius center. The "center" of a half ball means the center of the curved surface or the center for the radius and not the center of gravity. In most cases, the half ball center lies outside the half ball. The central ball to which the flat disk is secured may be molded integral to make a one-piece piston, or as in Fig. 10, may comprise two half ball portions held on either side of the flat disk by means of the disk pin which, as shown in Fig. 2, passes through all three pieces.

Figure 6:
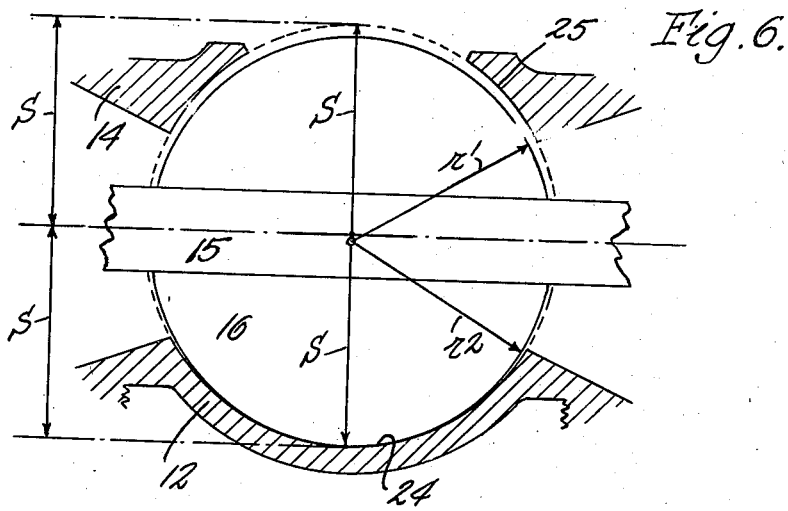
Fig. 6 is a fragmentary central sectional elevation of the meter showing the relationship between the ball and its sockets.

In a liquid meter of conventional disk type, a very thin liquid film forms all over the disk and the disk ball. When the meter is dry or assembled before use, the absence of such a film may provide an apparent clearance around the top of the ball of about one-fourth per cent of the ball radius. My invention as described includes such clearance for the usual liquid film, if clearances are measured with the meter dry. In actual operation with liquid, the liquid film raises the entire disk slightly to a point equidistant between the upper and lower walls of the measuring chamber. In Fig. 6, the disk is shown placed in the measuring chamber with the pin 17 vertical and it is in this position that dimensions are given for distance from the center of the sockets to points in the disk ball. In a conventional disk type meter, there is little or no clearance for disk ball expansion when the meter is in operation, but my invention provides predetermined clearance for disk ball expansion and in such a manner that full support for the disk is still retained because of the novel ball design.

In accordance with my invention, I make the disk ball so that the upper half thereof has a total clearance with the upper socket 25 of approximately 1% of the radius of the socket. It is not necessary to adhere strictly to the 1% clearance, since satisfactory results can be obtained if this clearance for expansion is from ⅛% to 3%, the preferred clearance for expansion for most uses to which meters are put being from ½% to ¾% of the radius of the spherical socket. The clearance between the disk ball and its sockets is greatly exaggerated in the drawings in order to make my invention more easily understood.

The clearance between the upper socket and the upper half ball of the piston may be obtained in any suitable or desired manner. In the construction shown in Figs. 1 to 6, I have made both the upper and lower halves of the ball 16 of a slightly smaller radius than the radius of the socket, so that the upper half of the ball will be spaced from the upper socket 25, while the lower ball will bear on the lower socket, because of the weight of the piston. In connection with this construction, I have noted by experiment that when the two halves of the ball 16 are equal in size and fit snugly into both sockets, as has heretofore been customary, in a meter having a ball of ⅝ inch radius, the ball will grip or stick in the sockets when the water reaches the temperature of 120° F. If in such meter, the radius of the upper half of this ball is reduced .002 of an inch, the piston of the meter will not stick until the water reaches a temperature of 135° F., and if the radius of the upper half of this ball is reduced to .004 of an inch less than the radius of the customary ball, the piston will not stick until it reaches a temperature of about 150° F.

My improved piston is preferably employed in connection with a meter in which the space above the upper socket 25 is enclosed for example, by means of a gear plate or sand cap 29, through which the pin 20 extends on which the disk 19 is secured. When an enclosure for this space above the upper bearing socket is provided, the tendency of liquid to leak through the joint between the upper half ball and its socket is greatly reduced.

Figure 7:
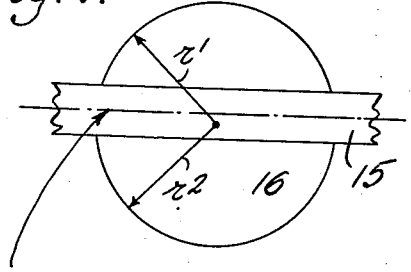
Figs. 7 to 9 are diagrammatic fragmentary side elevations of meter pistons each having a ball of slightly different form for accomplishing the desired results.

In accordance with my invention, the spherical seats 24 and 25 are preferably formed as heretofore. Various means may be employed to produce the desired relationship between the parts which results in the successful operation of the meter with greater freedom from damage from expansion of the ball due to heat or from swelling of Bakelite from impure gasoline containing moisture which produces expansion of the ball without increase in temperature. Fig. 7 illustrates diagrammatically the manner in which the piston shown in Figs. 1 to 6 is constructed. In these figures, the ball is of truly spherical form in that the radii of the upper and lower half balls are equal and both half balls have a common center, which is below the middle plane of the disk. The radii of the ball are slightly smaller than the radii of the spherical seats or sockets, which are indicated by S in Fig. 6. The radii of the upper half ball indicated by $r'$ in Figs. 6 and 7 is equal to the radius $r^2$ of the lower half ball. Consequently, the piston ball will fit in its sockets in the manner shown greatly exaggerated in Fig. 6, the lower half ball being held in engagement with its seat by gravity.

Actually the clearance between the upper portion of the ball and its socket may be less than 1% of the radius of the socket.

Figure 8:
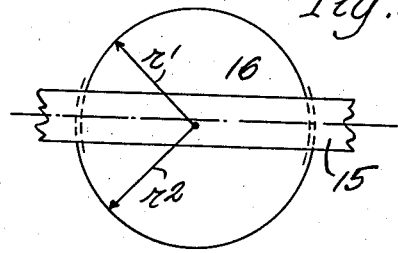

In Fig. 8, I have shown a construction in which the radius $r'$ of the upper half ball is less than the radius $r^2$ of the lower half ball. Consequently, with this construction, the lower half ball will fit into its socket 24 in the same manner as heretofore. In this construction, the two radii $r'$ and $r^2$ may have a common center which is located below the central plane of the disk, or the center for $r'$ may be slightly above the center for $r^2$.

Figure 9:
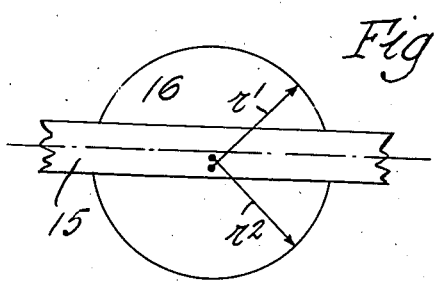

In Fig. 9, I have shown another arrangement in which the radius of the upper half ball $r'$ is equal to the radius of the lower half ball $r^2$ and in this figure, the center of the upper half ball is below the center plane of the disk web and may also be arranged below the center of the radius $r^2$ as shown. Fig. 9 differs from Fig. 7, as in Fig. 9 these two centers do not coincide. By this arrangement, the upper half ball will be spaced from the upper socket 25 to provide clearance such as hereinbefore stated.

In Fig. 10, I have shown how two separable half balls are assembled together with the flat disk to provide a ball in the middle portion of the disk. In this figure, the central point of the ball assembly is indicated as being on the vertical axis and equidistant from the two end surfaces of the ball. In Fig. 10, the upper half of the ball does not extend as far above the upper face of the disk as the lower half of the ball extends below the lower face of the disk and, therefore, as shown, the central point of the ball is below the plane of the disk. $b'$ is shown equal to $r^2$.

I have also found that improved operation of the meter results if the meter disk is provided in its periphery with a circumferentially extending groove. This groove is preferably not continuous around the periphery of the disk, since a continuous groove might form a passage for liquid from the inlet to the discharge of the meter. The groove is, therefore, preferably provided with one or more interruptions formed by ungrooved portions of the disk. I have, for example, shown in Figs. 1 to 3 and 5 a groove 30 formed in the greater portion of the periphery of the disk. The portion 31 of the periphery is not grooved, to prevent flow of liquid lengthwise of the groove. This groove may, for example, be formed so that it can be cut on a lathe while the disk is supported eccentrically, and when so formed, the portion of the groove at the slot 32 in the disk is of greatest depth, the depth of the groove decreasing to the portion 31 of the disk.

Figure 4:
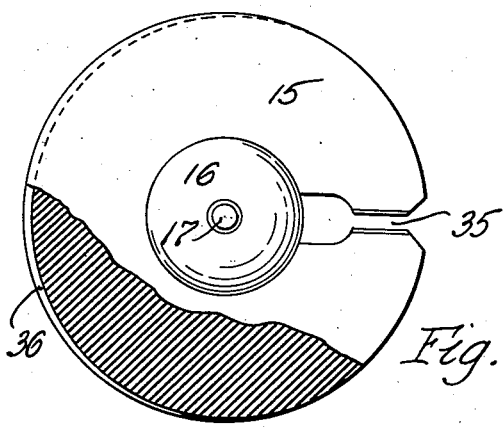
Fig. 4 is a similar view of a meter disk of slightly modified construction.
Figure 5:
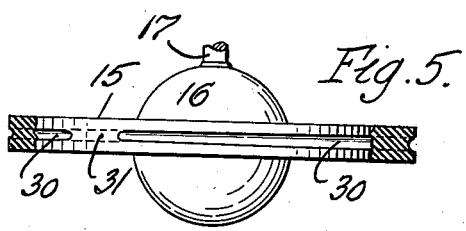
Fig. 5 is an edge view of a meter disk, partly in section, on line 5—5, Fig. 2.

The groove may also be formed as shown in Fig. 4, in which the portion of the disk adjacent to the slot 35 therein is ungrooved. The groove 36 in this disk, consequently, has its greatest depth at the portion of the disk opposite the slot 35. An interrupted groove of other suitable form may be employed.

In both of the constructions shown, the ungrooved portion of the periphery of the groove is formed, at least in part, on portions of the disk which cooperate with continuous or unbroken portions of the wall of the measuring chamber, so that they prevent flow of liquid lengthwise of the groove. If the interruption of the groove were located only at either the inlet or outlet part of the measuring chamber, flow lengthwise of the groove from the inlet to the outlet port obviously would not be stopped. Consequently, in Fig. 4, the ungrooved portion of the disk is shown as extending slightly beyond the ports when the disk is in position in the measuring chamber, so that at least some of the ungrooved parts of the disk cooperate with an unbroken surface of the outerwall of the measuring chamber.

The advantage of this groove is that the grooved disk tends to wipe out cleanly the inside of the measuring chamber, so that full amount of liquid is delivered for each cycle of nutation, rather than leaving some liquid adhering to the wall of the measuring chamber. The groove also reduces the friction of the circumferential portion of the piston with the wall of the measuring chamber, since the liquid packing at the edge of the disk has a portion of greater thickness, such as the portion of the liquid packing contained in the groove. The groove has been formed to decrease the variation in the coefficient correction factor during the normal flow range of the meter.

I claim as my invention:

1. In a liquid meter of the nutating piston type, a measuring chamber having upper and lower walls, a nutating disk in said chamber and having a ball in the middle portion thereof, substantially spherical bearing sockets for said ball formed in said upper and lower walls of said measuring chamber, said ball being so formed that when the lower portion thereof is seated in, supported by and contacting directly the bearing socket of said lower wall, the upper portion of said ball will have a maximum clearance with the bearing socket of said upper wall of between one-half of one percent to three percent of the radius of the said sockets.

2. In a liquid meter of the nutating piston type, a measuring chamber having upper and lower walls, a nutating disk in said chamber and having a ball in the middle portion thereof, spherical bearing sockets for said ball formed in said upper and lower walls of said measuring chamber, the central point of said ball being located below the central point of said spherical sockets a distance of from one-eighth to one and one-half percent of the radius of said sockets, when said disk is spaced equidistant between said upper and lower walls.

3. In a liquid meter of the nutating piston type, a measuring chamber having upper and lower walls, a nutating disk in said chamber and having a ball in the middle portion thereof, spherical bearing sockets for said ball formed in said upper and lower walls of said measuring chamber, the central point of said ball being located below the central point of said spherical sockets a distance of from one-fourth to three-fourths percent of the radius of said sockets, when said disk is spaced equidistant between said upper and lower walls.

4. In a liquid meter of the nutating piston type, a measuring chamber having upper and lower walls, a nutating disk in said chamber and having a ball in the middle portion thereof, spherical bearing sockets for said ball formed in said upper and lower walls of said measuring chamber, said ball having its central point located below the center plane of said disk and the upper half of said ball having a predetermined clearance with the upper socket when the lower half ball rests on its socket, said clearance being proportioned to retain a packing film of the liquid which is being measured and being not more than 3% of the radius of said sockets.

5. In a liquid meter of the nutating piston type, a measuring chamber having upper and lower walls, a nutating disk in said chamber and having a ball in the middle portion thereof, spherical bearing sockets for said ball formed in said upper and lower walls of said measuring chamber, said ball having the radius of a portion thereof engaging said upper socket not more than 3% less than the radius of said spherical sockets and having its center located below the central plane of said disk, whereby, upon expansion of said ball, said disk limits the upward movement of the upper half of said ball into its socket.

6. In a liquid meter of the nutating piston type, a measuring chamber having upper and lower walls, a nutating disk in said chamber and having a ball in the middle portion thereof, and spherical bearing sockets for said ball formed in said upper and lower walls of said measuring chamber, the upper half of said ball being of less radius than the lower half of said ball.

7. In a liquid meter of the nutating piston type, a measuring chamber having upper and lower walls, a nutating disk in said chamber and having a ball in the middle portion thereof, and spherical bearing sockets for said ball formed in said upper and lower walls of said measuring chamber, the two halves of said ball having radii of equal length, the center of the upper half ball and the center of the lower half ball both lying below both the center plane of said disk web and the center of said spherical sockets, to provide a slight predetermined clearance between said upper half ball and its socket, in which a film of liquid packing not exceeding in thickness one percent of the said radii may be formed.

8. In a liquid meter, the combination of a measuring chamber having an outer wall, a portion of which has ports and another portion of which is unbroken, a nutating piston in said chamber and including a disk and a ball in the middle portion thereof, said disk having a peripheral wall adapted to cooperate with said outer wall of said measuring chamber having a circumferentially extending groove therein, a portion of said peripheral wall cooperating with an unbroken portion of said outer wall being ungrooved to prevent flow of liquid lengthwise of said groove.

9. In a liquid meter, the combination of a measuring chamber having an outer wall, a portion of which has ports and another portion of which is unbroken, a nutating piston in said chamber and including a disk and a ball in the middle portion thereof, said disk having a peripheral wall adapted to cooperate with said outer wall of said measuring chamber having a circumferentially extending groove of varying thickness formed therein, the ends of said groove decreasing in thickness and terminating in spaced relation to each other to leave a portion of said peripheral wall ungrooved, said ungrooved portion being arranged to engage with an unbroken portion of the wall of the measuring chamber.

10. In a liquid meter of the nutating piston type, a measuring chamber having upper and lower walls, a nutating disk in said chamber and having a ball in the middle portion thereof, spherical bearing sockets for said ball formed in said upper and lower walls of said measuring chamber, the two halves of said ball having radii of equal length, the center of the upper half ball lying below the center of the lower half ball, to provide a slight predetermined clearance between said upper half ball and its socket, in which a film of liquid packing not exceeding in thickness one percent of the said radii may be formed.

ROBERT S. BASSETT.